(12) United States Patent
Allam et al.

(10) Patent No.: US 8,714,568 B2
(45) Date of Patent: May 6, 2014

(54) STORAGE CONTAINERS

(75) Inventors: Joseph Allam, Bristol (GB); Paul Hayton, Bristol (GB); Robert Law, Bristol (GB)

(73) Assignee: Magmatic Limited, Bristol (GB)

( * ) Notice: Subject to any disclaimer, the term of this patent is extended or adjusted under 35 U.S.C. 154(b) by 0 days.

(21) Appl. No.: 13/516,535

(22) PCT Filed: Dec. 1, 2010

(86) PCT No.: PCT/GB2010/052003
§ 371 (c)(1),
(2), (4) Date: Aug. 1, 2012

(87) PCT Pub. No.: WO2011/073634
PCT Pub. Date: Jun. 23, 2011

(65) Prior Publication Data
US 2012/0292867 A1    Nov. 22, 2012

(30) Foreign Application Priority Data

Dec. 18, 2009 (GB) .................................. 0922084.9

(51) Int. Cl.
*A45C 11/20* (2006.01)

(52) U.S. Cl.
CPC ....................................... *A45C 11/20* (2013.01)
USPC .......................................... 280/30; 280/79.2

(58) Field of Classification Search
CPC ................................................. B62B 2202/404
See application file for complete search history.

(56) References Cited

U.S. PATENT DOCUMENTS

| | | | | |
|---|---|---|---|---|
| 926,288 A | * | 6/1909 | Rice | 248/129 |
| 2,338,477 A | * | 1/1944 | Wolters et al. | 220/812 |
| 3,904,218 A | * | 9/1975 | Kostic | 280/79.2 |
| 3,960,252 A | * | 6/1976 | Cassimally | 190/18 A |
| 4,331,341 A | * | 5/1982 | McKeown | 280/47.34 |
| 4,372,568 A | * | 2/1983 | Campbell | 280/63 |
| 4,804,090 A | * | 2/1989 | Schuh et al. | 206/366 |
| 4,963,115 A | | 10/1990 | Stowell | |
| 5,353,470 A | * | 10/1994 | Bartlett | 15/328 |
| 5,413,515 A | | 5/1995 | Knox | |
| 5,465,844 A | * | 11/1995 | Lee | 206/515 |
| 5,472,220 A | * | 12/1995 | Stephan | 280/79.5 |
| 5,531,351 A | * | 7/1996 | Logsdon | 220/571.1 |
| 5,564,805 A | * | 10/1996 | Dickinson | 312/249.8 |
| 5,671,826 A | * | 9/1997 | Zenoni | 184/16 |
| 5,680,932 A | * | 10/1997 | Dickinson et al. | 206/372 |
| 5,709,008 A | * | 1/1998 | Dickinson | 16/45 |
| 5,718,350 A | | 2/1998 | Williams | |
| 5,758,888 A | * | 6/1998 | Burgan et al. | 280/47.34 |
| 5,906,291 A | | 5/1999 | Mann | |
| 5,992,680 A | * | 11/1999 | Smith | 220/812 |

(Continued)

FOREIGN PATENT DOCUMENTS

| | | |
|---|---|---|
| CN | 2194337 | 4/1995 |
| CN | 2552822 | 5/2003 |

(Continued)

*Primary Examiner* — Hau Phan
*Assistant Examiner* — Jacob Meyer
(74) *Attorney, Agent, or Firm* — Michael Haynes PLC; Michael N. Haynes

(57) ABSTRACT

A storage container (1) has a hollow storage box (10) and a lid (12). The lid (12) includes wheels (14) which enable the storage container (1) to be used as a ride-on toy by a child.

10 Claims, 16 Drawing Sheets

(56) References Cited

U.S. PATENT DOCUMENTS

| | | | |
|---|---|---|---|
| 6,039,205 A * | 3/2000 | Flink | 220/659 |
| 6,193,247 B1 * | 2/2001 | Spear et al. | 280/33.998 |
| 6,488,293 B1 * | 12/2002 | Mitchell et al. | 280/47.34 |
| 6,550,792 B1 * | 4/2003 | Salmon et al. | 280/47.24 |
| 6,736,416 B1 * | 5/2004 | Romeo | 280/47.26 |
| 6,755,428 B2 * | 6/2004 | Butler | 280/47.26 |
| 6,837,183 B2 * | 1/2005 | Aspøy | 119/237 |
| 7,017,780 B2 * | 3/2006 | Renaud | 221/263 |
| 7,063,339 B2 * | 6/2006 | Jarko et al. | 280/47.19 |
| 7,188,745 B2 * | 3/2007 | Schermel | 220/23.4 |
| 7,246,805 B2 * | 7/2007 | Neal et al. | 280/35 |
| 7,364,172 B1 * | 4/2008 | Archer | 280/79.5 |
| 7,997,412 B2 * | 8/2011 | Henry et al. | 206/542 |
| 8,157,094 B2 * | 4/2012 | Schiessl | 206/457 |
| 8,256,242 B1 * | 9/2012 | Evans | 62/457.7 |
| 8,286,681 B2 * | 10/2012 | Goldman | 156/575 |
| 8,360,445 B2 * | 1/2013 | Meers et al. | 280/47.26 |
| 2002/0167138 A1 * | 11/2002 | Butler | 280/47.26 |
| 2003/0136699 A1 * | 7/2003 | McNeeley et al. | 206/518 |
| 2003/0177983 A1 * | 9/2003 | Aspoy | 119/237 |
| 2004/0035867 A1 | 2/2004 | Schultz | |
| 2004/0232637 A1 * | 11/2004 | Butler | 280/47.26 |
| 2007/0235963 A1 * | 10/2007 | Killinger et al. | 280/47.26 |
| 2010/0072100 A1 * | 3/2010 | Henry et al. | 206/459.5 |
| 2010/0090428 A1 * | 4/2010 | Meers et al. | 280/47.26 |
| 2011/0186458 A1 * | 8/2011 | Schiessl | 206/457 |
| 2012/0082589 A1 * | 4/2012 | Ladison et al. | 422/26 |

FOREIGN PATENT DOCUMENTS

| | | |
|---|---|---|
| CN | 201105841 | 8/2008 |
| JP | 2000142904 | 5/2000 |
| WO | WO2009/077204 | 6/2009 |

* cited by examiner

STORAGE CONTAINERS

BACKGROUND OF THE INVENTION

There is currently a market need for storage containers that appeal to younger consumers. It is therefore desirable to overcome the limitations of existing storage solutions with regard to younger consumers to make a multi functional storage container with added play value.

SUMMARY OF THE INVENTION

According to the present invention, there is provided a storage container comprising a storage box defining a hollow storage volume, and a loading aperture for enabling access to the storage volume, and having a base portion opposite the loading aperture, and a closure member having a plurality of rotatable wheels located thereon, and having an open side and a closed side, with edge regions extending therebetween, the closure member being adapted for releasable engagement with the storage box, wherein the storage container has a first configuration, in which the base portion of the storage box is in contact with a supporting surface, and in which the loading aperture of the storage box is adjacent the open side of the closure member, such that the loading aperture is closed by the closure member, wherein the storage container has a second configuration, in which the wheels located on the closure member are in contact with a supporting surface, and in which the loading aperture of the storage box is adjacent the open side of the closure member, such that the loading aperture is closed by the closure member, and wherein the storage container has a third configuration, in which the wheels located on the closure member are in contact with a supporting surface, and in which the base portion of the storage box is adjacent, and supported by, the open side of the closure member, such that the loading aperture is open.

The open side of the closure member may have a convex curved profile, and the storage container then has a fourth configuration in which the base portion of the storage box is adjacent, and supported by, the closed side of the closure member, and in which convex curved profile of the closure member engages with a supporting surface, thereby allowing the container to rock.

The base portion of the storage box may be shaped to provide a saddle when the container is in the first configuration, thereby enabling a child to sit on and comfortably propel themselves along in the style of a ride-on vehicle.

Such a storage container may also comprise an attachment device for attachment to another such container, thereby creating a storage train enhancing play value. Such an attachment device may be located on the storage box and work in both the first and third configurations.

Such a storage container may further comprise a latch device located on the storage box and arranged for releasable engagement with the closure member.

In such a storage container, the closure member may include a wheel location portion for each wheel, and each wheel may be rotatably secured to a wheel location portion using an axle unit. Such an axle unit may comprise an elongate axle that extends through the wheel, and may be adapted to enable rotation of the wheel with respect to the axle, and may include at least one locating feature adapted to engage with a corresponding feature of the wheel locating portion of the closure member, so as to hold the axle unit in place on the closure member.

Such a storage container may include a storage box that shaped to allow nesting of a plurality of such storage boxes inside one another.

Multiple storage containers may be stacked in the first or second configurations to form towers enhancing storage volume in limited spaces.

Such a storage container may include a closure member which has a convex curved profile.

Such a storage container can have an enhanced benefit when used for travel, as the storage container also provides the entertainment value of several toys, thus negating the need to take as many toys on said journey.

DETAILED DESCRIPTION OF THE PREFERRED EMBODIMENTS

Figure 1:
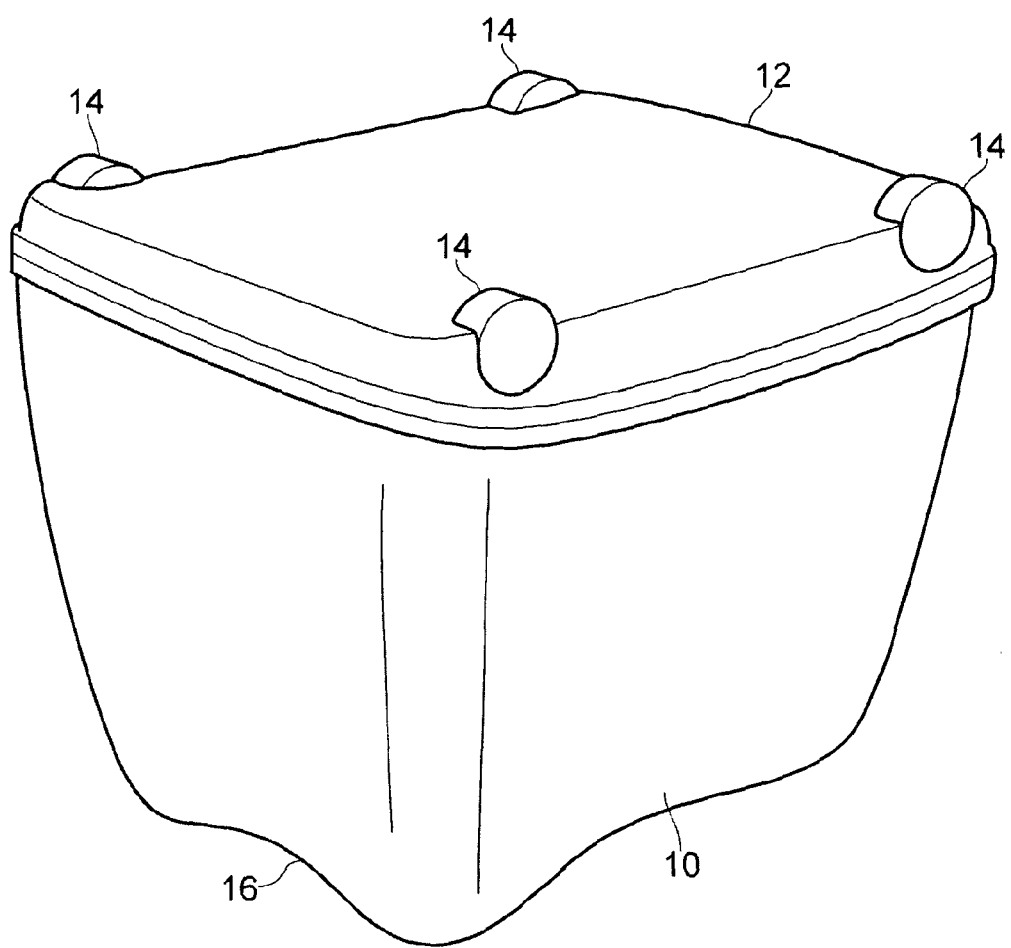
FIG. 1 illustrates a storage container embodying the present invention in a first configuration.

FIG. 1 of the accompanying drawings illustrates a storage container 1, having a storage box 10, and a closure member, or lid, 12. The storage box 10 is a substantially hollow container that defines a substantially hollow volume for storing articles therein, and has open loading aperture through which the volume is accessed. The lid 12 engages with the storage box, and serves to close the loading aperture. The lid 12 is provided with a plurality of wheels 14 that project from a first side thereof.

FIG. 1 illustrates a storage container 1 embodying the present invention in a first configuration. In this first configuration the storage box 10 is placed on the ground, or other suitable surface, and the lid 12 closes the loading aperture of the storage box 10. The lid 12 is releasably engaged with the storage box 10, so that a user can gain access to the storage volume of the storage box 10. In this first configuration, the wheels 14 located on the lid 12 extend away from the storage box 10, and so do not engage the ground. The top of the storage box 10 engages the ground.

Figure 2:
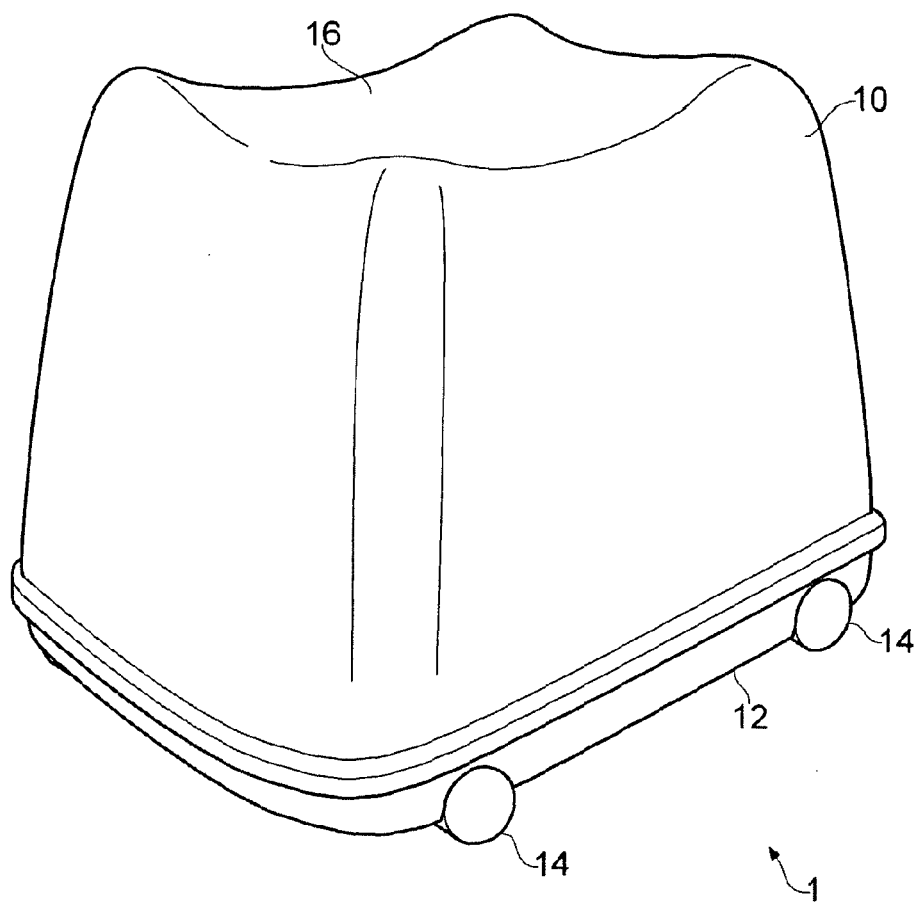
FIG. 2 illustrates a storage container embodying the present invention in a second configuration.

In a second configuration, as shown in FIG. 2, the loading aperture of the storage box 10 is closed by the lid 12, and the storage box 10 is releasably engaged with, and located on top of, the lid 12. The wheels 14 located on the lid 12 are arranged to extend from the lid 12 away from the storage box 10, such that the wheels 14 are able to engage a supporting surface, such as a floor or the ground. Accordingly, in this second configuration, the storage container 1 can function as a ride-on toy for a child. The storage box 10 preferably has a sculpted shape 16 which can serve as a saddle for the child.

Figure 3:
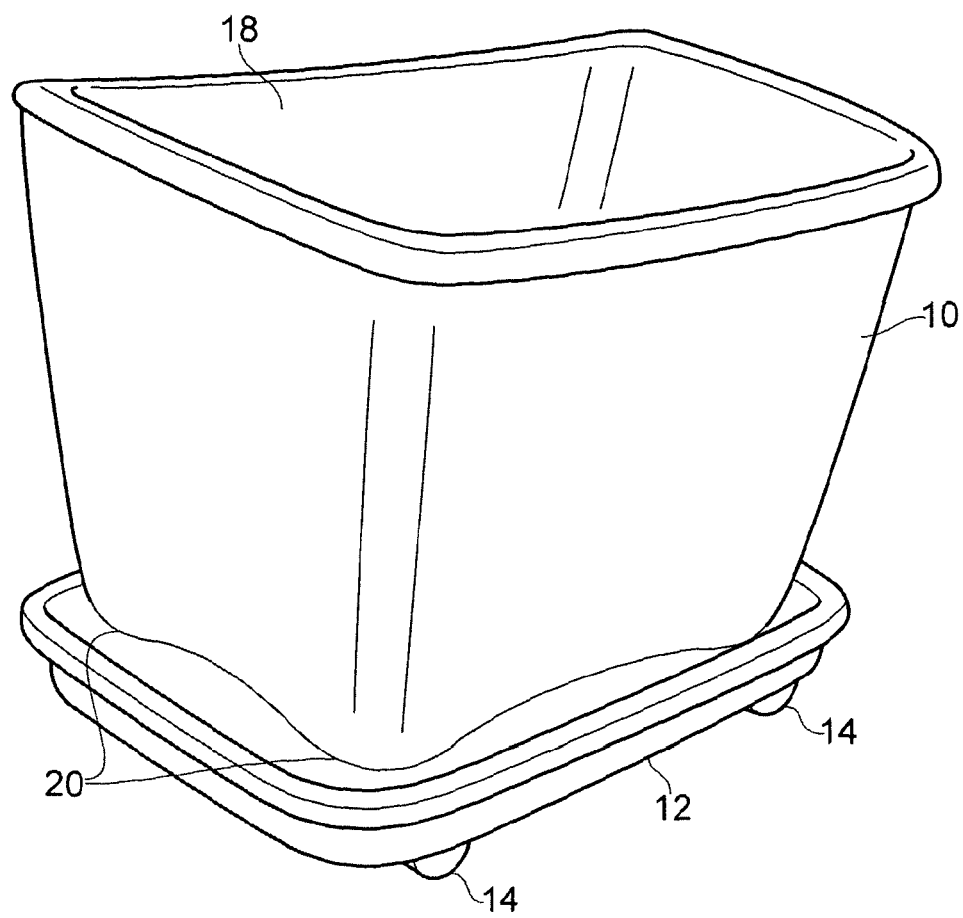
FIG. 3 illustrates a storage container embodying the present invention in a third configuration.

FIG. 3 illustrates a storage container embodying the present invention in a third configuration, in which the storage box 10 is located on top of the lid 12, with the loading aperture uppermost, and open for use. The lid 12, with the wheels 14 located thereon engaging the ground, serves to enable the open storage box 10 to be rolled along. FIG. 3 illustrates the substantially hollow storage volume 18 into which items for storage can be placed. The storage box 10 has portions 20 which engage with appropriate corresponding portions of the lid such that the box 10 is releasably held in place in this roll-along storage configuration.

Figure 4:
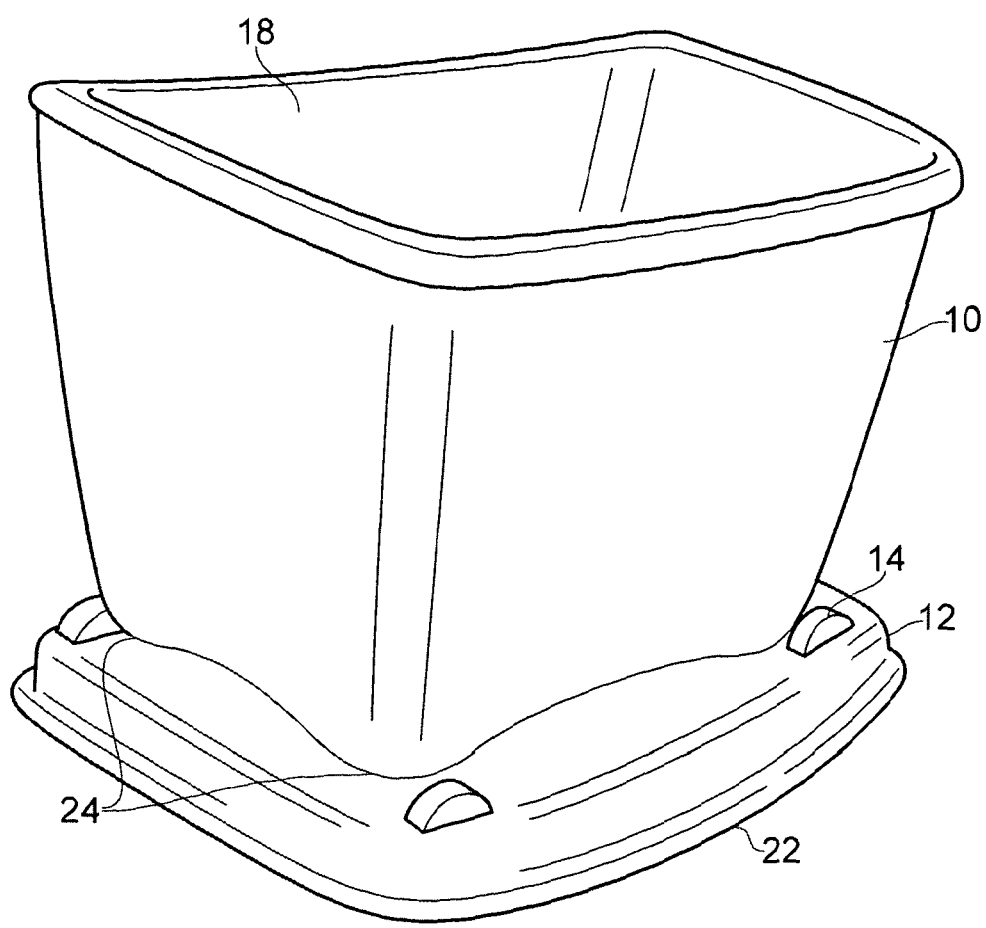
FIG. 4 illustrates a storage container embodying the present invention in a fourth configuration.

FIG. 4 illustrates the storage container 1 in a fourth configuration. Once again, the storage box 10 is releasably engaged on top of the lid 12 using location portions 24. The lid 12, however, is inverted such that the wheels 14 do not engage the ground, and so the lid 12 is not able to be rolled along the ground. Instead, in this example, the lid 12 is provided with a convex curved profile 22 that enables the lid 12 to be rocked, thus enabling the open storage box 10 to be rocked.

Figure 5:
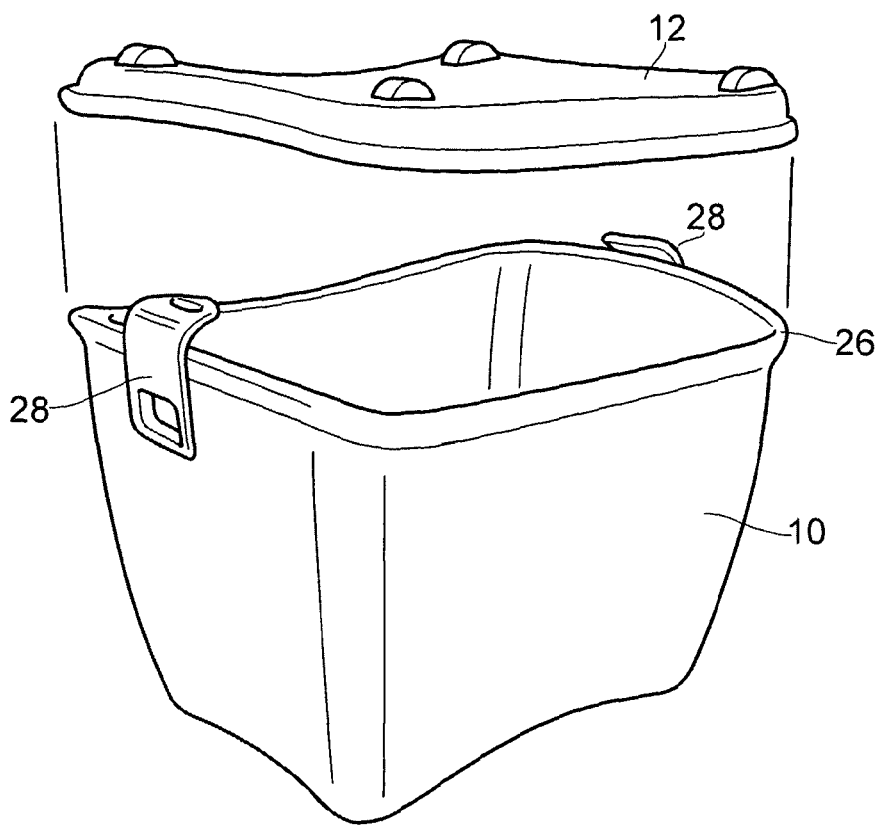
FIG. 5 illustrates a storage container embodying the present invention.
Figure 6:
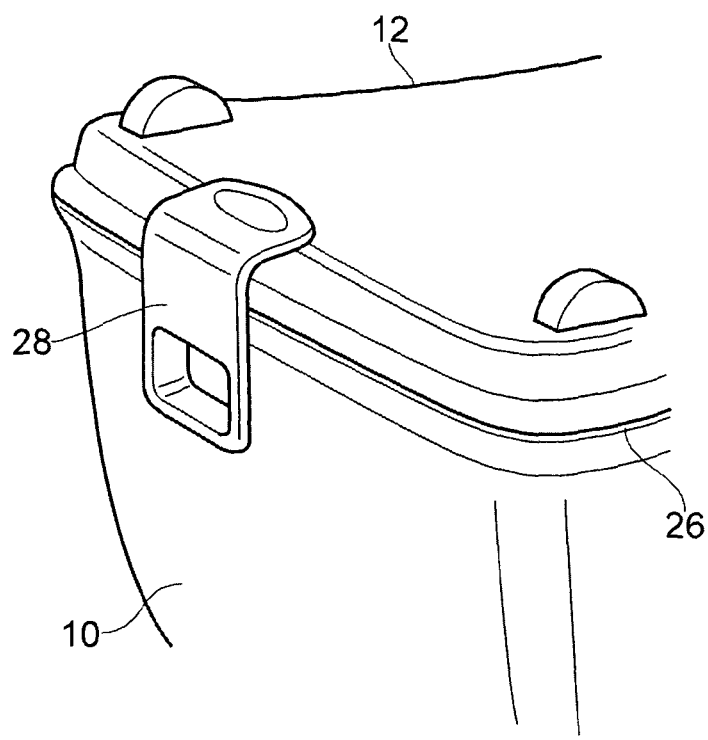
FIG. 6 illustrates details of the storage container of FIG. 5.

FIG. 5 illustrates the storage box 10 and removable lid 12. The lid 12 removably engages with an edge portion 26 of the storage box 10 that surrounds the loading aperture. The embodiment of the present invention illustrated in FIG. 5 includes closure latches 28. The latches 28 are mounted externally on the storage box 10 proximate the edge portion 26, and are movable so as to releasably engage with the lid 12 when the lid 12 is engaged with the edge portion 12. FIG. 6 illustrates the latching mechanism of FIG. 5 in more detail. The latch 28 is arranged to be mounted on the storage box 10 so as to be rotatable with respect to the box 10. In this way, the latch can be moved out of engagement with the lid 12, thereby enabling removal of the lid 12. In order to fix the lid 12 to the edge portion 26 of the box, the latches are rotated with respect to the box 10 from an open position into a locked position shown in FIG. 6.

Figure 7:
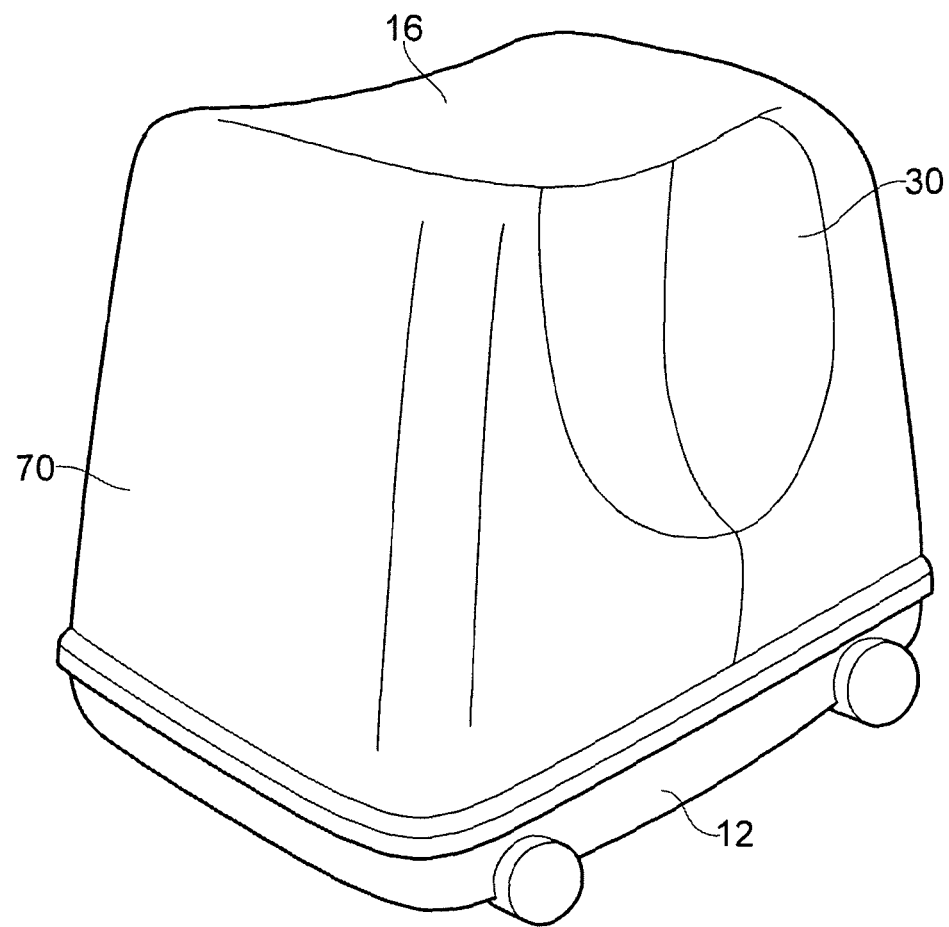
FIG. 7 illustrates another storage container embodying the present invention.

FIG. 7 illustrates a storage container embodying the present invention, in which the storage box 10 is provided with additional shaping 3 which integrates with the saddle portion 16 in order to improve comfort when the container is used in the ride-on configuration.

Figure 8:
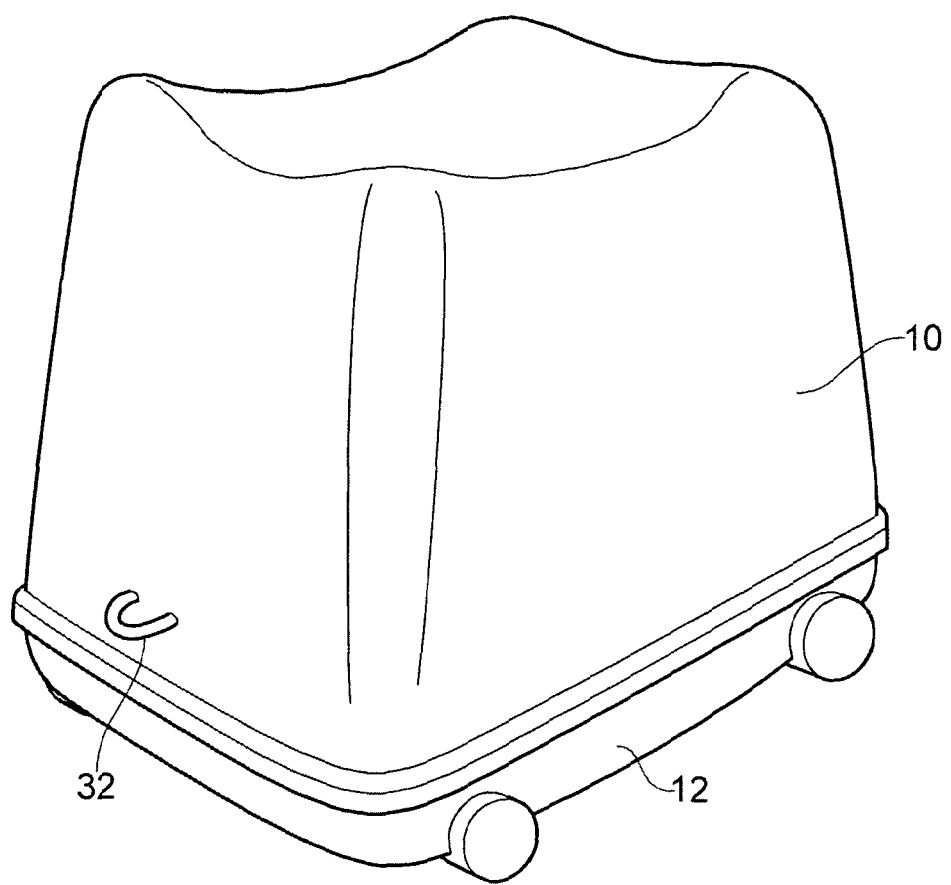
FIG. 8 illustrates another storage container embodying the present invention.
Figure 9:
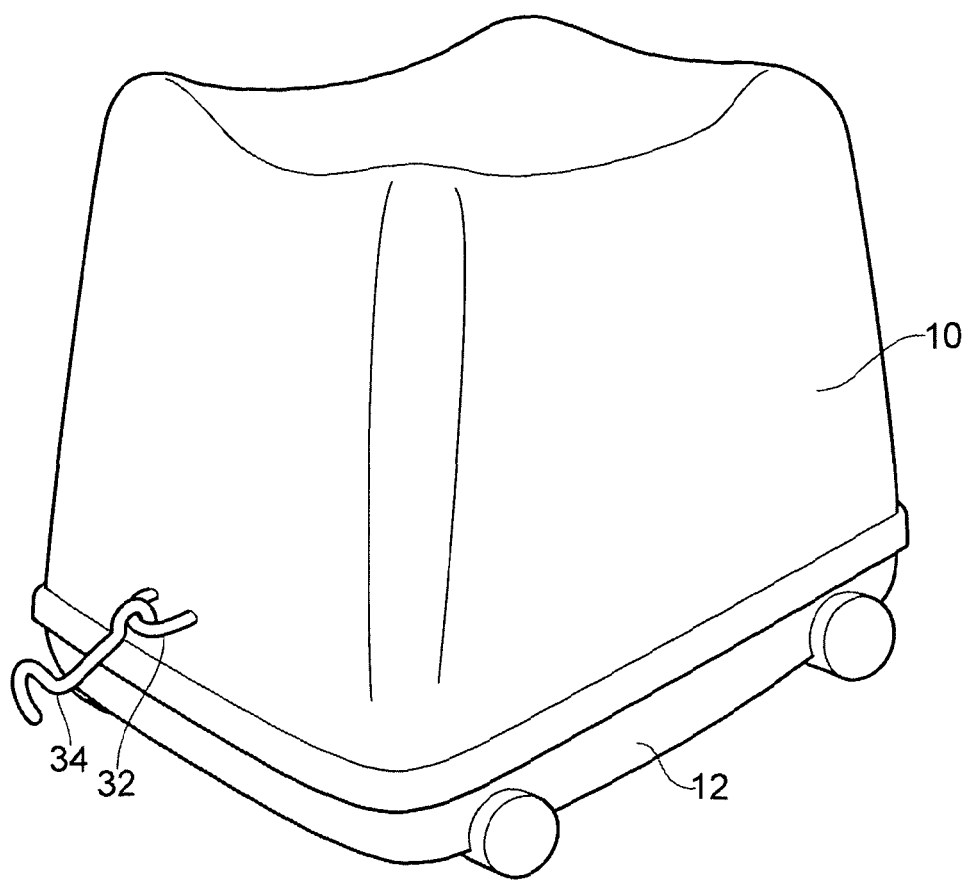
FIG. 9 illustrates another storage container embodying the present invention.
Figure 10:
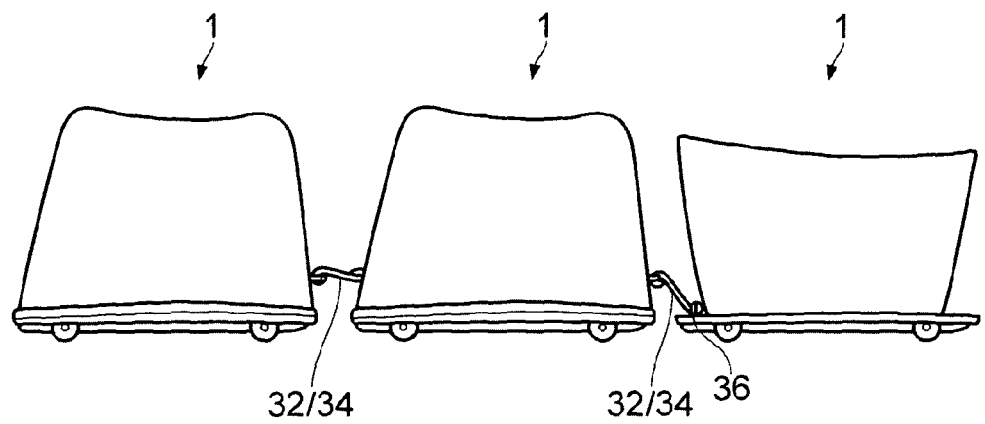
FIG. 10 illustrates a series of storage containers embodying the present invention.

FIGS. 8 to 10 illustrate features of a storage container that enable a train of containers to be formed for rolling along. As shown in FIGS. 8 and 9, the storage box 10 is provided with a tow loop 32 and a tow hook 34. The tow hook is releasably engaged with the tow loop 32, and enables adjacent storage boxes to be interconnected, as illustrated in FIG. 10. The actual arrangement of the tow loop 32 and tow hook 34 is determined by overall design considerations. As an example, the lid 12 may be provided with a tow loop 36 (FIG. 10) that allows a container in the roll-along storage configuration to be part of a train of containers.

Figure 11:
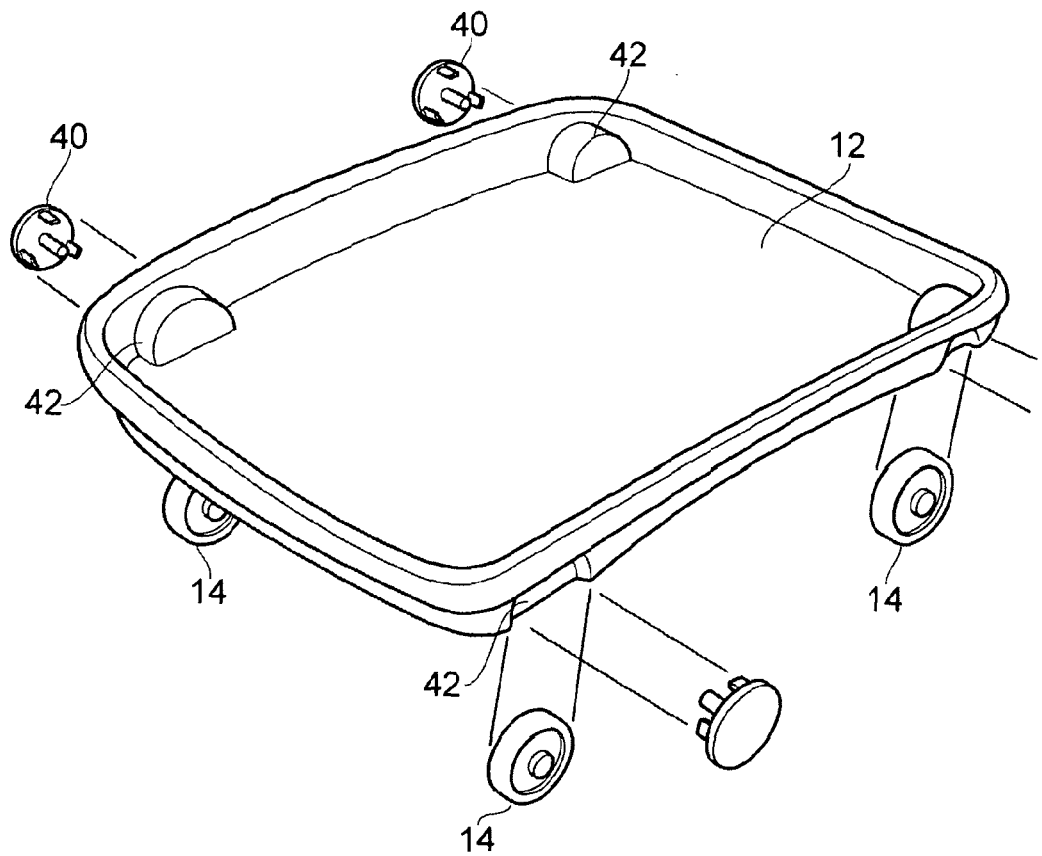
FIG. 11 illustrates details of a storage container embodying the present invention.
Figure 12:
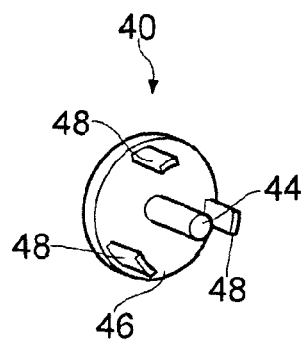
FIG. 12 illustrates details of the storage container of FIG. 11.

FIG. 11 illustrates fitting of wheels 14 into the lid 12 of a storage container embodying one aspect of the present invention. The lid 12 is provided with wheel locating portions 42, which are preferably moulded as part of the manufacture of the lid 2. The wheels 14 are held in place in the wheel locating portions of the lid by respective axle units 40. An axle unit 40 is illustrated in more detail in FIG. 12. The axle unit 40 comprises an axle 40 which extends from a body portion 46, and which carries the wheel 14 when fitted to the lid 12. The axle unit 40 also includes locating tabs 48 (three in the example shown, but any number can be used) which are used to locate the axle unit 40 in corresponding locating slots (not shown) in the lid 12. In order to fit a wheel 14 to the lid 12, the wheel 14 is offered up into place in the wheel locating portion 42 of the lid, and the axle unit 40 is then pushed into place in the lid 12, with the locating tabs 48 if the axle unit 40 engaging with the locating slots of the lid 12, thereby holding the axle unit 40 in place in the wheel locating portion 42 of the lid 12. The wheel 14 is rotatably mounted on the axle 44 of the axle unit 40, in order to enable the lid 12, and hence container 1, to be rolled along the ground, as described above.

Figure 13:
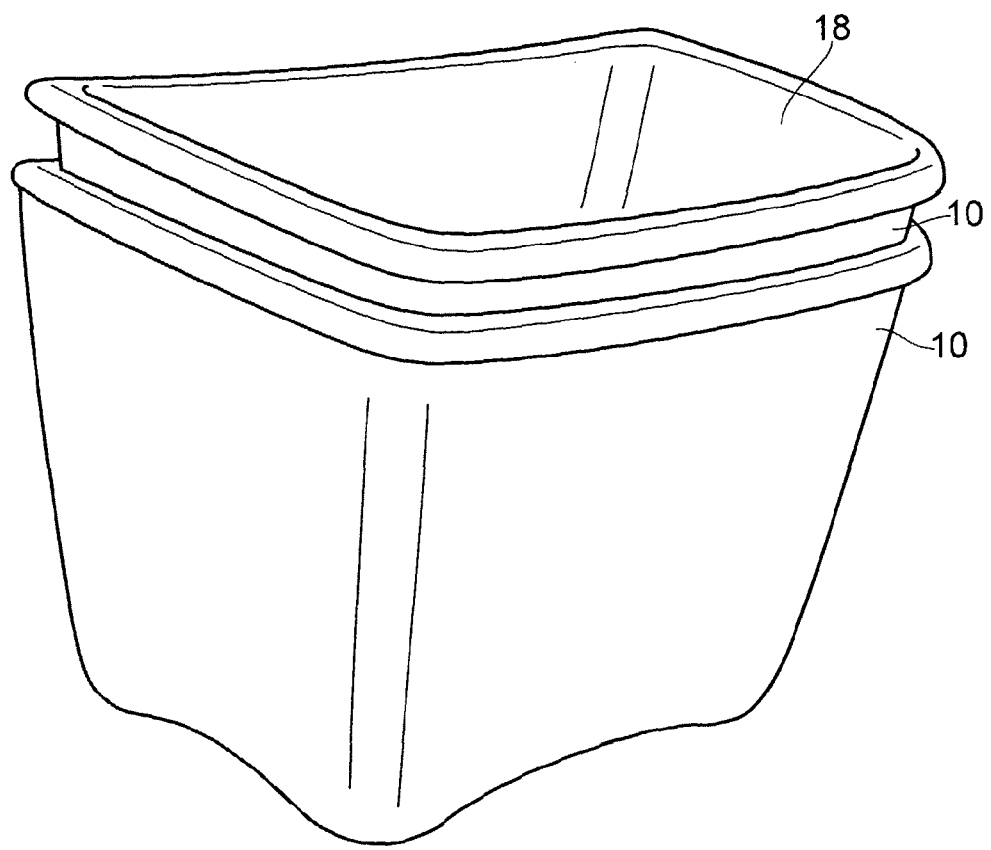
FIG. 13 illustrates storage containers embodying the present invention in a nested configuration.

FIG. 13 illustrates the nesting ability of the storage boxes 10. Each storage box 10 defines a substantially hollow storage volume 18, and is shaped so that one box 10 can be nested inside the volume 18 of another box 10, as shown in FIG. 13.

Figure 14:
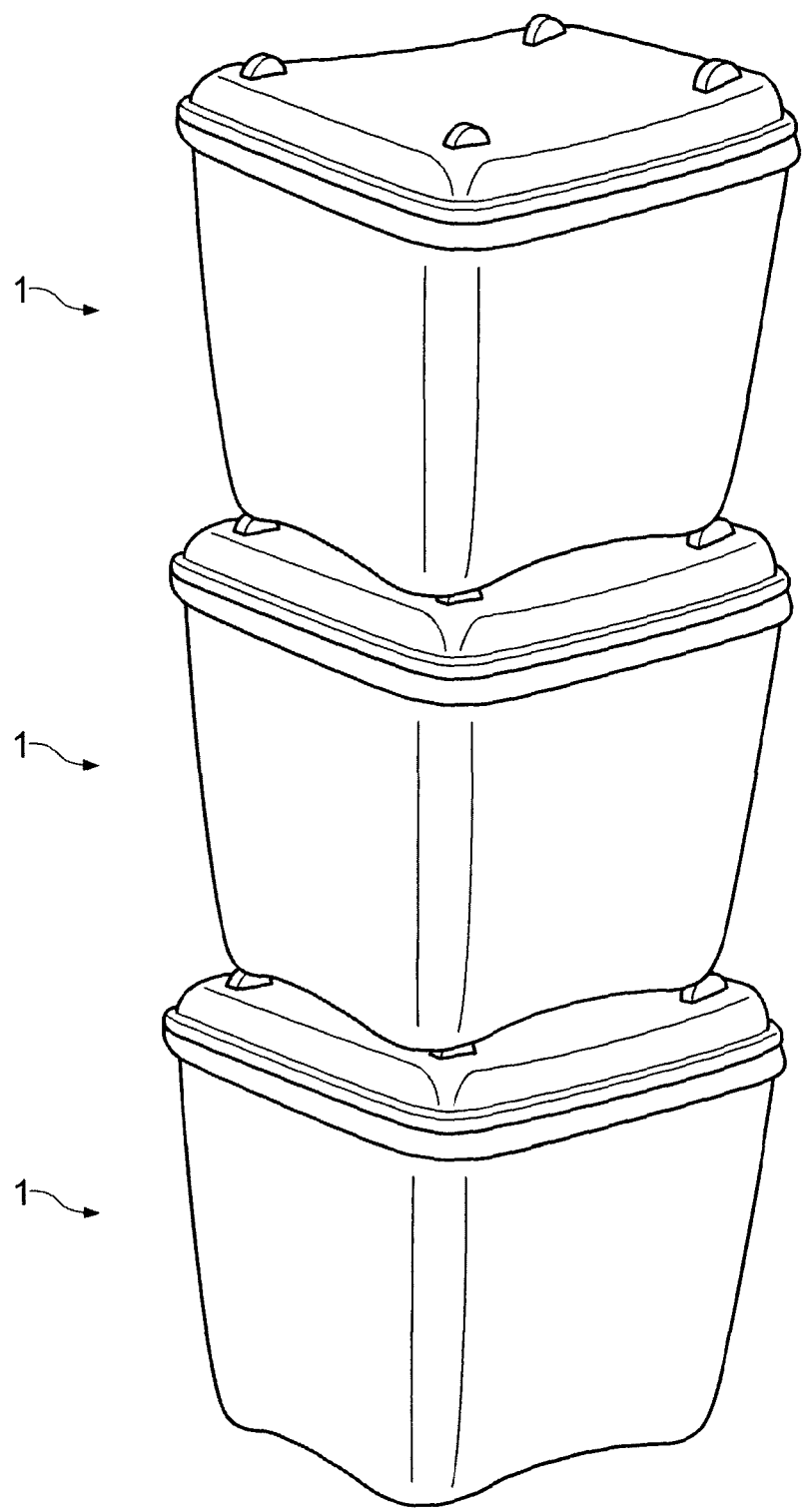
FIGS. 14 and 15 illustrate storage containers embodying the present invention in respective stacked configurations.
Figure 15:
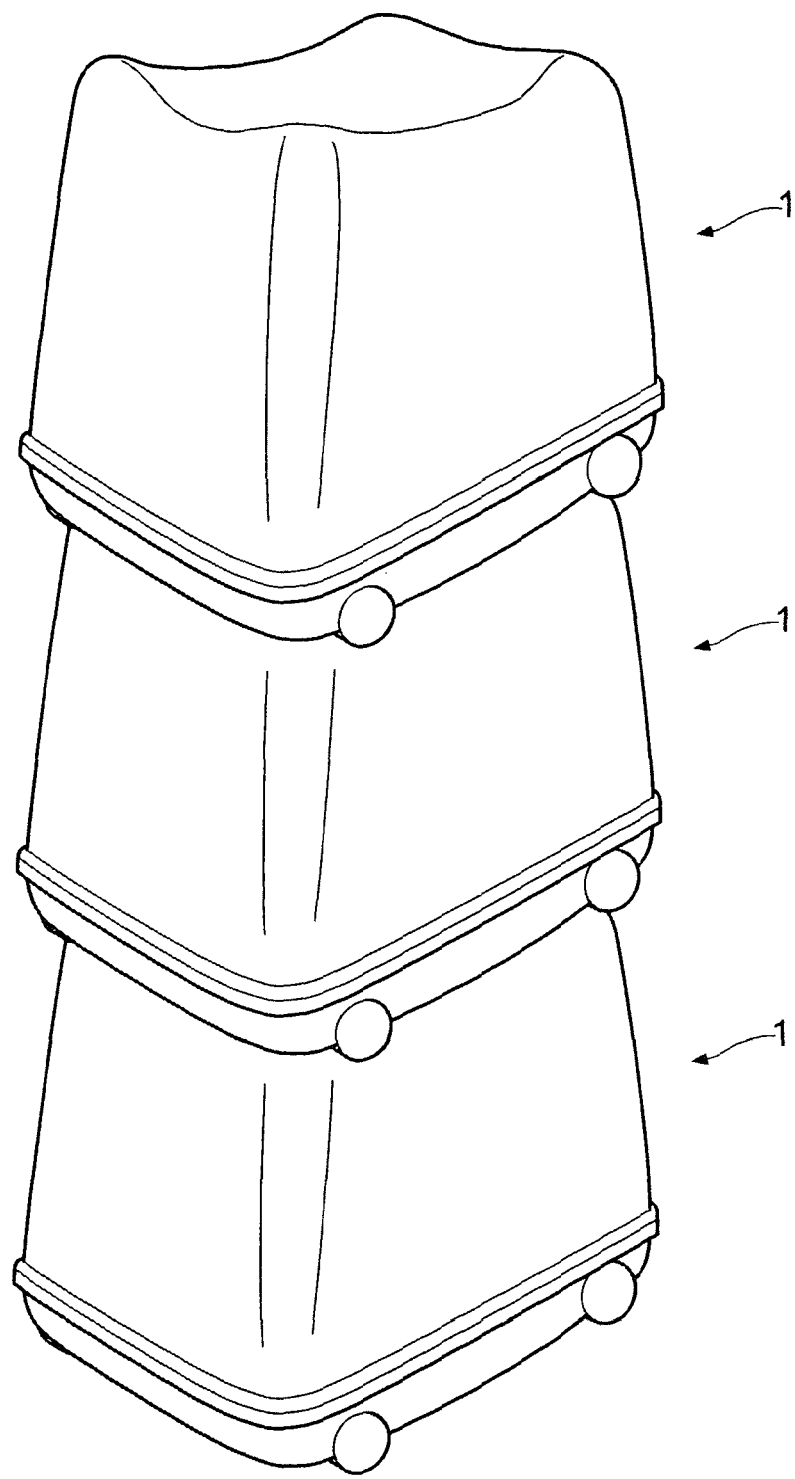

FIGS. 14 and 15 each show a plurality of storage containers arranged in a tower. In FIG. 14, the containers are stacked on top of one another in the first configuration. That is the container have their respective lids upper most, and the lid of a lower container supports the storage box of the next container higher in the tower. In contrast, FIG. 15 illustrates a tower of a plurality of storage containers in the second configuration, in which the wheels of the lid of the lowest container are supported on a surface, and the storage box of supports the lid of the next container in the tower.

Figure 16:
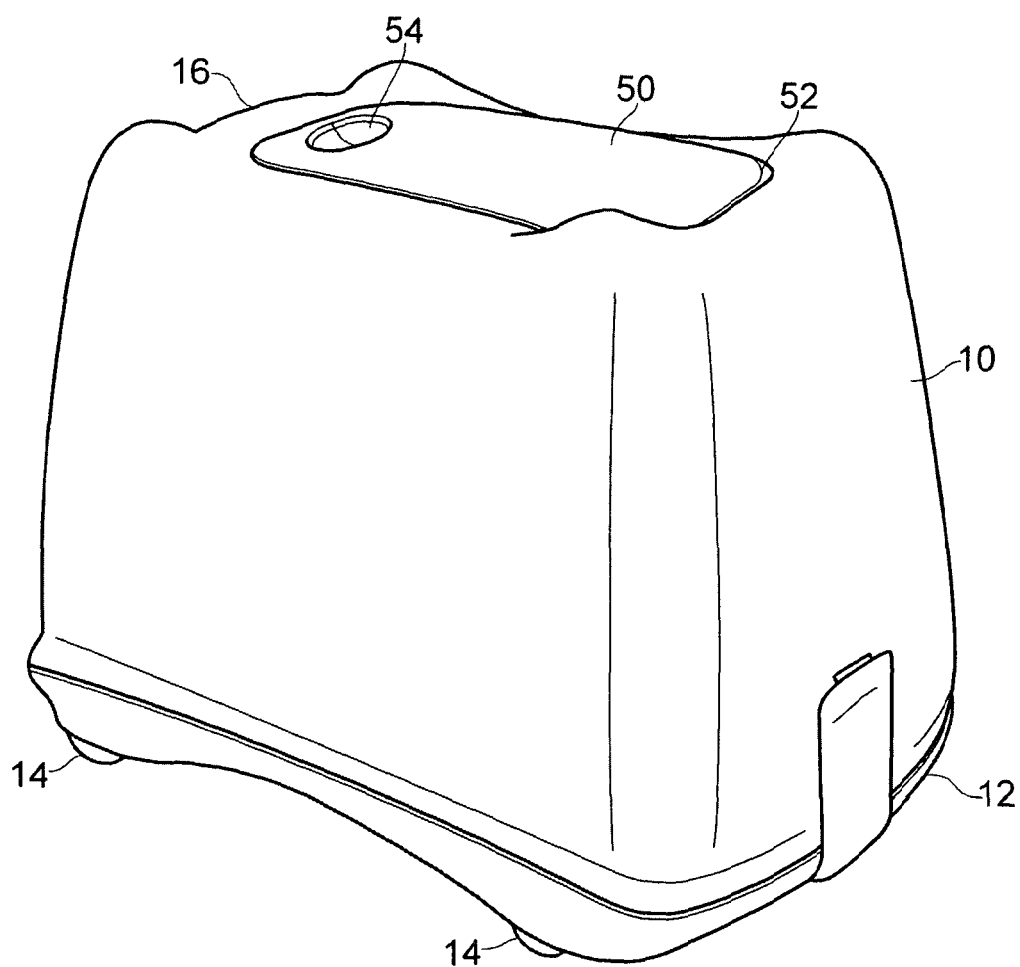
FIGS. 16 and 17 illustrate a storage container embodying the present invention incorporating and additional feature.
Figure 17:
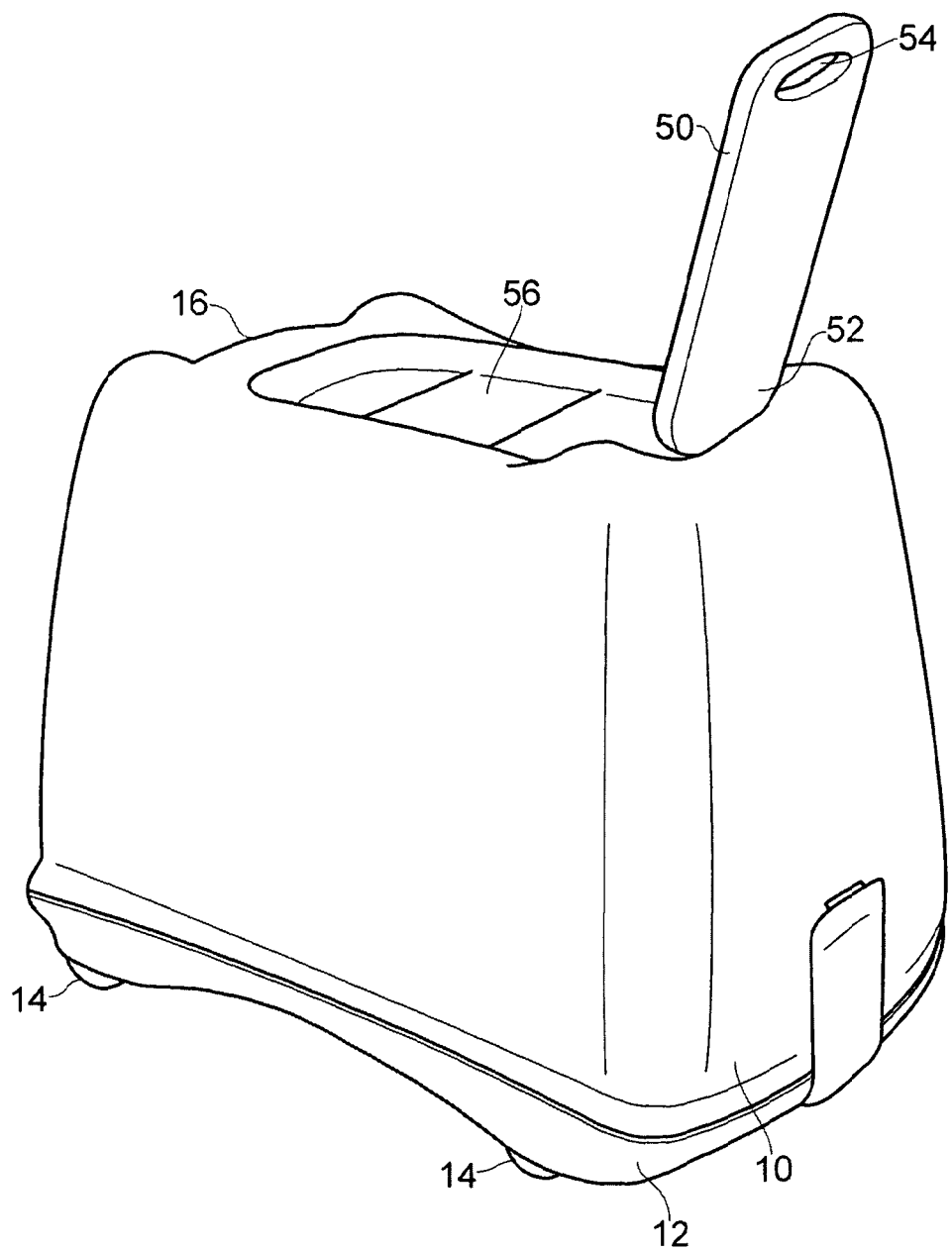

FIGS. 16 and 17 illustrate a storage container embodying the present invention incorporating and additional feature. In the embodiment of FIGS. 16 and 17, the storage box 10 is provided with a second lid 50 which is attached to the saddle region 16 of the storage box 10. The second lid is shown in a closed configuration in FIG. 16, and in an open configuration in FIG. 17. When in the open configuration, access is possible to a secondary storage volume 56 which is defined in the saddle region 16. The second lid 50 is attached to the storage box 10 by way of a hinge 52, or equivalent feature that allows the second lid 50 to rotate with respect to the storage box 10, between the open and closed configurations. The second lid 50 is preferably provided with a handhold 54, which enables the second lid 50 in the open configuration to also act as a handle for pulling the storage container along on the wheels 14.

As an alternative, a storage box embodying the present invention may include the second "lid" 50, but not be provided with the secondary storage volume 56. In that case the second lid 50 acts only as a folding handle for pulling the storage container along on the wheels 14. In this case the second lid 50 is more accurately described as a handle portion 50.

The invention claimed is:
1. A storage container comprising:
a storage box defining a hollow storage volume, and a loading aperture for enabling access to the storage volume, and having a base portion opposite the loading aperture; and
a closure member having a plurality of rotatable wheels located thereon, and having an open side and a closed side, with edge regions extending therebetween, the closure member being adapted for releasable engagement with the storage box, wherein the storage container has a first configuration, in which the base portion of the storage box is in contact with a supporting surface, and in which the loading aperture of the storage box is adjacent the open side of the closure member, such that the loading aperture is closed by the closure member, wherein the storage container has a second configuration, in which the wheels located on the closure member are in contact with a supporting surface, and in which the loading aperture of the storage box is adjacent the open side of the closure member, such that the loading aperture is closed by the closure member, wherein the storage container has a third configuration, in which the wheels located on the closure member are in contact with a supporting surface, and in which the base portion of the storage box is adjacent, and supported by, the open side of the closure member, such that the loading aperture is open, and wherein the open side of the closure member has a convex curved profile, and wherein the storage container has a fourth configuration in which the base portion of the storage box is adjacent, and supported by, the closed side of the closure member, and in which the convex curved profile of the closure member engages with a supporting surface, thereby allowing the storage container to rock.

2. A storage container as claimed in claim 1, wherein:
the base portion of the storage box is shaped to provide a saddle when the container is in the first configuration.

3. A storage container as claimed in claim 1, further comprising:
an attachment device for attachment to another such container.

4. A storage container as claimed in claim 1, further comprising:
an attachment device for attachment to another such container, wherein the attachment device is located on the storage box.

5. A storage container as claimed in claim 1, further comprising:
a latch device located on the storage box and arranged for releasable engagement with the closure member.

6. A storage container as claimed in claim 1, wherein:
the storage box is shaped to allow nesting of a plurality of such storage boxes inside one another.

7. A storage container as claimed in claim 1, further comprising:
locating features which enable a plurality of containers to be stacked in either the first or second configuration, thereby forming a tower of containers.

8. A storage container as claimed in claim 1, wherein:
the closure member includes a wheel location portion for each wheel, and each wheel is rotatably secured to a wheel location portion using an axle unit, the axle unit comprising an elongate axle that extends through the wheel, and is adapted to enable rotation of the wheel with respect to the axle, and at least one locating feature adapted to engage with a corresponding feature of the wheel locating portion of the closure member, so as to hold the axle unit in place on the closure member.

9. A storage container as claimed in claim 1, further comprising:
a handle portion attached to the storage box.

10. A storage container as claimed in claim 1, further comprising:
a handle portion attached to the storage box, wherein the storage box further comprises a secondary storage volume, and wherein the handle portion serves as a openable lid for the secondary storage volume, and has a closed configuration in which the secondary storage volume is closed, and an open configuration in which the secondary storage volume is open, and in which the handle portion functions as a handle for pulling the storage container.

* * * * *